A. C. DANVER.
INFLATING DEVICE FOR AUTOMOBILE TIRES.
APPLICATION FILED AUG. 10, 1911.
1,011,121. Patented Dec. 5, 1911.
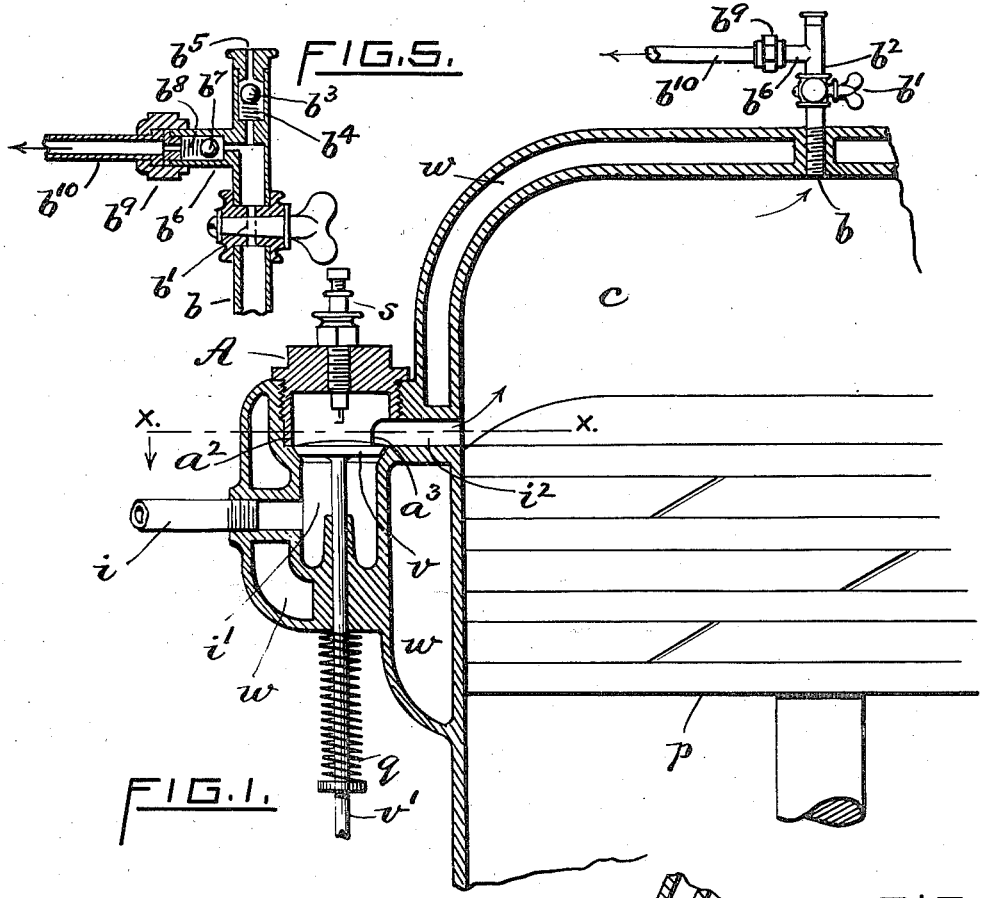
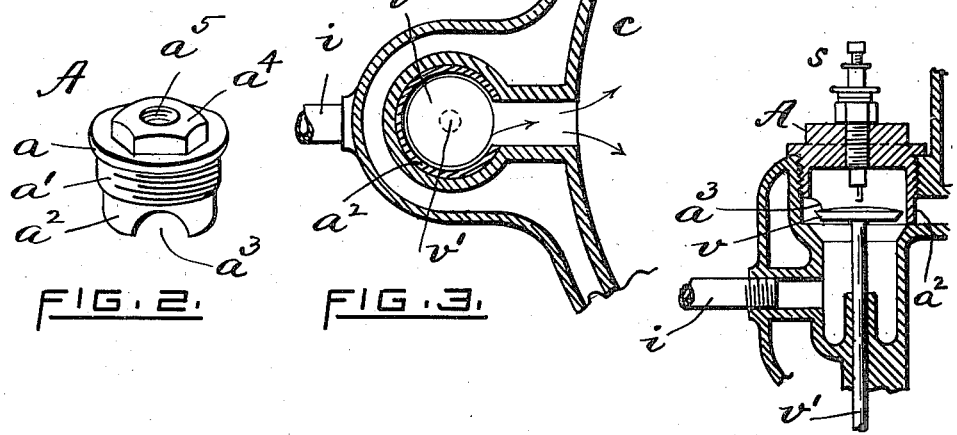
WITNESSES:
C. T. Hannigan.
Edith M. Bromley.
INVENTOR:
Andrew C. Danver
By James A. Jenks
Attorney.

UNITED STATES PATENT OFFICE.

ANDREW C. DANVER, OF PITTSBURGH, PENNSYLVANIA, ASSIGNOR OF ONE-HALF TO WILLIAM ELY OF PROVIDENCE, RHODE ISLAND.

INFLATING DEVICE FOR AUTOMOBILE-TIRES.

1,011,121.  Specification of Letters Patent.  Patented Dec. 5, 1911.

Application filed August 10, 1911. Serial No. 643,472.

*To all whom it may concern:*

Be it known that I, ANDREW C. DANVER, a citizen of the United States, residing at Pittsburgh, in the county of Allegheny and State of Pennsylvania, have invented certain new and useful Improvements in Inflating Devices for Automobile-Tires, of which the following is a specification.

My invention relates to improvements in inflating devices for automobile tires.

The purpose of my invention is to utilize one of the cylinders of an automobile engine as an air compressor and connect the same with the tire by a suitable connection, so that the tire may be inflated to any required pressure up to the capacity of the engine. I accomplish this object by the mechanism shown in the drawings accompanying this application in which drawings—

Figure 1 represents a portion of an automobile cylinder and piston in vertical section with my device attached thereto. Fig. 2, a perspective detail of the member operating to cut out the valves of the engine. Fig. 3, a horizontal cross section on the line $x$—$x$ of Fig. 1. Fig. 4, a vertical section showing one position of my cut-out mechanism, and Fig. 5, a vertical section through the check valve by which the air passes from the cylinder to the tube leading to the tire.

The same portions of the invention are represented by the same letters throughout the several views.

In Fig. 1, which is a vertical section through a portion of the cylinder, $p$ represents the piston showing its rings in position; $c$, the space or chamber in the cylinder above the piston; $w$ the water space surrounding the cylinder; $v$, $v'$ and $q$, the valve, valve stem, and valve spring, respectively. As the construction of both exhaust and inlet valves is the same, and as my cut-off device must be applied to both valves, $v$ may represent both exhaust and inlet valves. $i^2$ is the port leading from the valve chamber to the interior of the cylinder; $i$, the inlet pipe leading from the carbureter or exhaust pipe, as the case may be; $i'$ the space below the valve seat; $s$, an ordinary spark plug and A a cut-out valve which is the principal feature of my invention, and which is screwed into the upper part of the valve chamber above the valve $v$ as shown in Fig. 1.

Fig. 5 shows in vertical section a system of check valves of the usual ball form which permits air to enter the chamber $c$ upon the downward stroke of the piston by means of the orifice $b^5$ in the valve system and forces it out through the tube $b^{10}$ upon the up stroke of the piston $p$. This check valve system is connected with the chamber $c$, as shown in Fig. 1, by the tube $b$; while the tube $b^{10}$ leads directly to the tire to be inflated. The check valve system is provided with an ordinary cock $b'$ by which it may be shut off entirely from the chamber $c$.

The principal feature of my device is shown in the member A seen in perspective in Fig. 2 and in vertical section in Figs. 1 and 4. In Fig. 2 this feature of my invention is seen to consist substantially of a cup shaped member A provided with a hexagonal head $a^4$ pierced and threaded for a spark plug as shown at $a^5$; it also has a projecting flange $a$. Immediately below this flange, the body of the cup is threaded as shown at $a'$ of Fig. 2, and adapted to be screwed into the upper portion of the valve chamber as shown best in Fig. 4. That portion of the body of the member A directly below the threaded portion $a'$ is reduced in diameter and is fitted to the valve chamber above the valve by an air and gas tight fit preferably being ground therein, but at the same time capable of being revolved in said valve chamber by means of the hexagonal head $a^4$. A portion of the lower wall $a^2$ of the cup A is removed or cut away, as shown at $a^3$, and this cut away portion in area is approximately equal to the port $i^2$ of the cylinder, and when said cup is in position in the valve chamber, the cut away portion $a^3$ is capable of being brought into opposition with or away from the port $i^2$ by revolving the cup A by means of the hexagonal head $a^4$. The shape and size of the cavity of the cup A are such as not to interfere in any way with the valve $v$ in its movements.

It will readily be seen that if the cup A is turned in such a manner that the opening $a^3$ is in opposition to the port $i^2$, then the engine will operate in its usual way, the cut-out valve A in no manner interfering with such operation. It will also clearly be seen that if the cut-out valve A is turned so that the space $a^3$ is not in opposition with the port $i^2$ then the cylinder is entirely cut off from the valves and the result is the same with both inlet and exhaust valves, both requiring to be fitted with my device, and both operating in precisely the same manner.

The operation of my invention is as follows:—When it is desired to use the engine as an engine, or, in other words, to permit it to run as a part of the motive power of the automobile, the cock $b'$ in the check valve system is shut, and the cut-out valve A is turned in both exhaust and inlet chambers so that the cut away portion or space $a^3$ is in opposition with the inlet port $i^2$. The engine will now operate in its usual manner as a part of the motive power of the automobile; but when it is desired to utilize the cylinder for the purpose of inflating tires, the cock $b'$ in the check valve system is opened and the cut-out valve A is turned in both exhaust and inlet chambers so that the space $a^3$ is no longer in opposition with the port $i^2$. By now causing the cylinder of a multi-cylinder automobile to which my device is attached to be operated by the remaining cylinders, the cylinder so fitted with my device becomes a powerful pump; the piston in its downward stroke drawing in air through the tube $b$ and orifice $b^5$ and forcing it on its upward stroke out through the tube $b$, $b^6$, and $b^{10}$ into the tire desired to be inflated, the operation continuing until the desired compression is reached, when the cock $b'$ is closed the cut-out cup A in both exhaust and inlet chambers turned so that the space $a^3$ is in opposition to the port $i^2$ and the cylinder again becomes a part of the motive power of the automobile.

One especial advantage of my invention is the fact that the cut-out valve A is so close to the cylinder chamber $c$ that the compression in the chamber when the cylinder operates as a pump is much higher than as though the cut-out valve were located at a more remote part of the inlet or exhaust system, inasmuch as the air space subject to compression is reduced practically to the contents of the cylinder itself.

My device is attached to but a single cylinder of a multi-cylinder system and the cut-out valve A is attached to both the inlet and exhaust valve chambers, as already stated.

Having now set forth my invention, what I claim and desire to secure by Letters Patent is—

1. A device for inflating automobile tires consisting of one cylinder of a multi-cylindered automobile engine; a cut-out valve operating to connect with or disconnect from the port of said cylinder the exhaust and inlet valves thereof; and means for connecting said cylinder with the tire to be inflated, substantially as set forth.

2. A device for inflating automobile tires consisting of one cylinder of a multi-cylindered automobile engine; a valve chamber located between the exhaust and inlet valves of said cylinder and the port thereof; a cut-out valve situated in said chamber and operating to make or break connection as desired between said valves and said port; and means for connecting said cylinder with the tire to be inflated, substantially as set forth.

3. A device for inflating automobile tires consisting of one cylinder of a multi-cylindered automobile engine; a valve chamber located between the exhaust and inlet valves of said cylinder and the port thereof; a cup-shaped cut-out valve situated in said chamber and having a portion of its lower wall removed so that the space left in said wall by such removal may at will be brought into and out of opposition to the port of the cylinder, thus making or breaking connection between said valves and said port; in combination with a system of check valves connected with the upper portion of said cylinder and operating to admit air into the cylinder on the downward stroke of the piston and to transmit it to the tire from the cylinder on the upward stroke of the piston, substantially as set forth.

In testimony whereof I affix my signature in presence of two witnesses.

ANDREW C. DANVER.

Witnesses:
J. M. ELIAS,
JOHN J. RULLY.